United States Patent [19]
Sutoh et al.

[11] Patent Number: 5,367,564
[45] Date of Patent: Nov. 22, 1994

[54] STORAGE-AND-FORWARD APPARATUS

[75] Inventors: Yasuo Sutoh, Ebina; Toshiaki Tanigawa, Atsugi, both of Japan

[73] Assignee: Ricoh Company, Ltd., Tokyo, Japan

[21] Appl. No.: 653,289

[22] Filed: Feb. 11, 1991

[30] Foreign Application Priority Data

Feb. 13, 1990 [JP] Japan ................................ 2-32994
May 16, 1990 [JP] Japan ............................... 2-127910

[51] Int. Cl.⁵ .......................................... H04M 11/00
[52] U.S. Cl. ..................... 379/100; 358/402; 358/407
[58] Field of Search ................. 379/60, 94, 96, 97, 379/98, 93; 358/407, 402, 434

[56] References Cited

U.S. PATENT DOCUMENTS

| | | | |
|---|---|---|---|
| 4,811,385 | 3/1989 | Watanabe | 379/100 |
| 4,870,678 | 9/1989 | Adachi | 379/100 |
| 4,935,955 | 6/1990 | Neudorfer | 379/100 |
| 5,038,226 | 8/1991 | Nagaishi | 358/404 |
| 5,077,787 | 12/1991 | Masatomo | 379/100 |

*Primary Examiner*—Curtis Kuntz
*Assistant Examiner*—Stella L. Woo

*Attorney, Agent, or Firm*—Oblon, Spivak, McClelland, Maier & Neustadt

[57] ABSTRACT

A storage-and-forward apparatus accommodates a plurality of private lines and a plurality of public lines. The storage-and-forward apparatus includes an exchange for carrying out a connection and a disconnection between each of the private lines and each of the second lines, and an image memory for storing image information transmitted via each of the private lines from a facsimile. The storage-and-forward apparatus directly relays image information transmitted via each of the private lines from the facsimile to a destination coupled to a corresponding one of the public lines in a first mode, and stores the image information transmitted via each of the private lines from the facsimile in the image memory and transmits the information stored in the image memory to the destination via a corresponding one of the public lines in a second mode. The storage-and-forward apparatus communicates with the facsimile and the destination in the second mode in a case where the facsimile transmits a command for requesting a communication by the first mode to the storage-and-forward apparatus when the destination is communicating to another communication terminal.

9 Claims, 5 Drawing Sheets

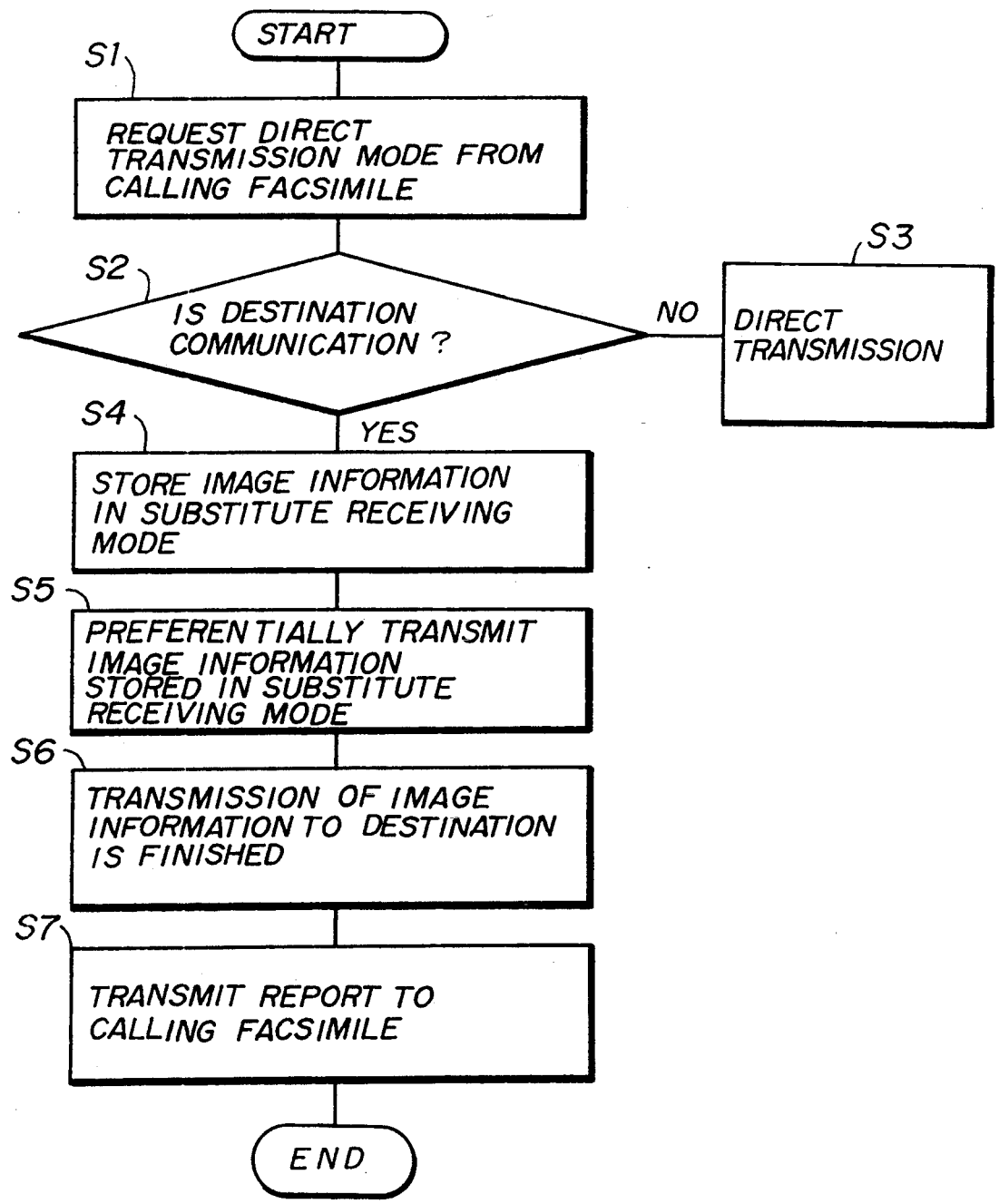

STORAGE-AND-FORWARD APPARATUS

BACKGROUND OF THE INVENTION

The present invention generally relates to a storage-and-forward apparatus, and more particularly to a storage-and-forward apparatus by which various services for a communication terminal coupled to a private line located in-plant can be improved.

Recently, a storage-and-forward apparatus which controls a plurality of communication terminals such as facsimiles to produce various services for users of the communication terminal has been proposed.

For example, the storage-and-forward apparatus accommodates a plurality of public lines and a plurality of private lines which are located in an in-plant, and switches connections of the public lines and the private lines. The storage-and-forward apparatus can operate in a direct transmission mode and a substitute receiving mode. For example, when a facsimile coupled to a private line transmits a command requesting a communication in the direct transmission mode to the storage-and-forward apparatus, the storage-and-forward apparatus calls a destination identified by the facsimile via a public line, and connects the private line for the facsimile to the public line for the destination. Then the storage-and-forward apparatus directly relays image information transmitted from the facsimile to the destination. A request for the communication in the direct transmission mode is often made in a case where it is necessary for the facsimile to rapidly transmit the image information to the destination.

The storage-and-forward apparatus has an image memory which is used in the substitute receiving mode. For example, when a facsimile coupled to a private line transmits a command requesting the communication process in the substitute receiving mode to the storage-and-forward apparatus, the storage-and-forward apparatus stores image information transmitted via the private line from the facsimile in the image memory. And then, when a predetermined waiting time elapses, the storage-and-forward apparatus connects the private line, on which a call out is produced, to the public line to which the destination is coupled. Then the image information is read out from the image memory and is transmitted via the public line to the destination.

A request for the substitute receive mode described above is generally made in a case where it is unnecessary for the facsimile to rapidly transmit the image information to the destination.

When the facsimile transmits a command requesting the communication process in the direct transmission mode to the storage-and-forward apparatus, the storage-and-forward apparatus calls the public line coupled to the destination, as described above. In this case, if the destination is communicating with another facsimile, the storage-and-forward apparatus cannot connect the private line to the public line to which the destination is coupled. That is, the communication between the calling facsimile and the destination in direct transmission mode fails. As a result, the user of the facsimile must operate the facsimile so that it transmits a command requesting the communication process in either the direct transmission mode or the substitute receiving mode to the storage-and-forward apparatus again.

That is, if the destination is communicating with another communication terminal when the calling facsimile transmits a command for requesting the communication process in the direct transmission mode, the number of operations, in the calling facsimile, for transmitting the image information increases.

SUMMARY OF THE PRESENT INVENTION

Accordingly, a general object of the present invention is to provide a novel and useful storage-and-forward apparatus in which the disadvantages of the aforementioned prior art are eliminated.

A more specific object of the present invention is to provide a storage-and-forward apparatus capable of preventing the number of operations, in a calling terminal, for transmitting information from increasing.

Another object of the present invention is to provide a storage-and-forward apparatus by which it is possible to definitely transmit information from the calling station to a destination.

The above objects of the present invention are achieved by a storage-and-forward apparatus which accommodates a plurality of first lines and a plurality of second lines, each of the first lines being coupled to a communication terminal and each of the second lines being coupled to a communication terminal, the storage-and-forward apparatus comprising: exchange means for carrying out a connection and a disconnection between each of the first lines and each of the second lines; memory means for storing information transmitted via each of the first lines from the communication terminal; first mode communication means, coupled to the exchange means, for directly relaying information transmitted via each of the first lines from the communication terminal to a destination coupled to each corresponding one of the second lines; second mode communication means, coupled to the exchange means and the memory means, for storing the information transmitted via each of the first lines from the communication terminal in the memory means and for transmitting the information stored in the memory means to the destination via each corresponding one of the second lines; and mode changing means for activating the second communication means in a case where the communication terminal transmits a command requesting a communication by the first mode communication means to the storage-and-forward apparatus when the destination is communicating with another communication terminal.

Another object of the present invention is to provide a storage-and-forward apparatus by which it is possible to transmit information from the calling terminal to the destination as soon as possible, in a case where the destination is communicating with another communication terminal.

The above objects of the present invention are achieved by the storage-and-forward apparatus described above, wherein the second mode communication means further comprises order setting means for setting a transmission order which is an order to transmit the information stored in the memory means so that the information which is stored in the memory means when the mode changing means activates the second mode communication means has priority over other information stored in the memory means, and wherein the second mode communication means transmits information to the destination due to the transmission order set by the order setting means.

Additional objects, features and advantages of the present invention will becomes apparent from the following detailed description when read in conjunction with the accompanying drawings.

BRIEF DESCRIPTION OF THE DRAWINGS

FIG. 6 is a flow chart illustrating a process for changing communication modes and a process for preferentially transmitting the image information.

DESCRIPTION OF PREFERRED EMBODIMENTS

A description will now be given of a first embodiment of the present invention with reference to FIGS. 1, 2 and 3.

Figure 1:
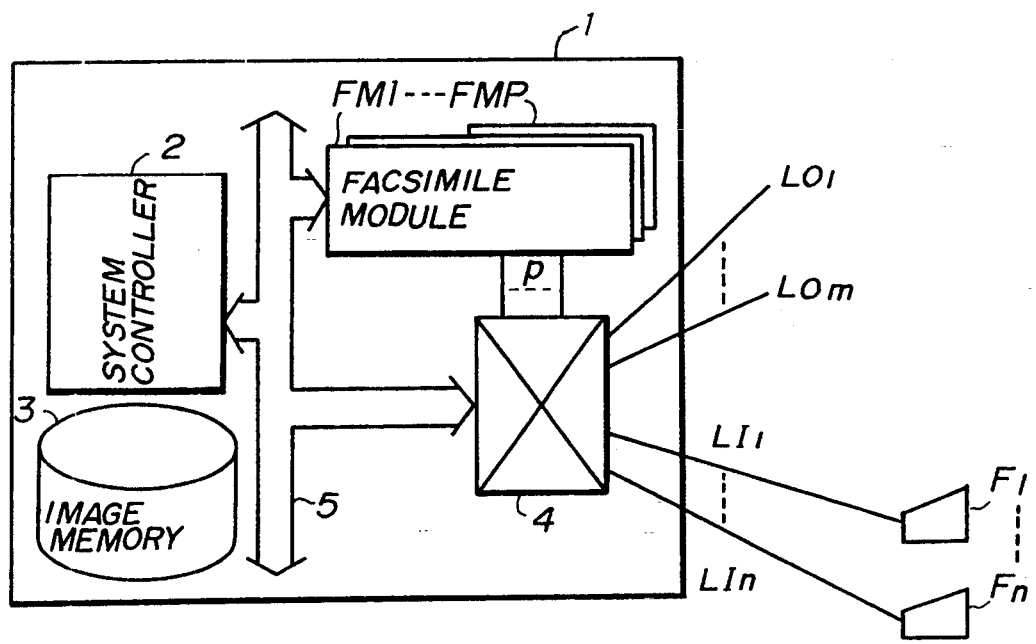
FIG. 1 is a block diagram illustrating a storage-and-forward apparatus according to a first embodiment of the present invention.
Figure 2:
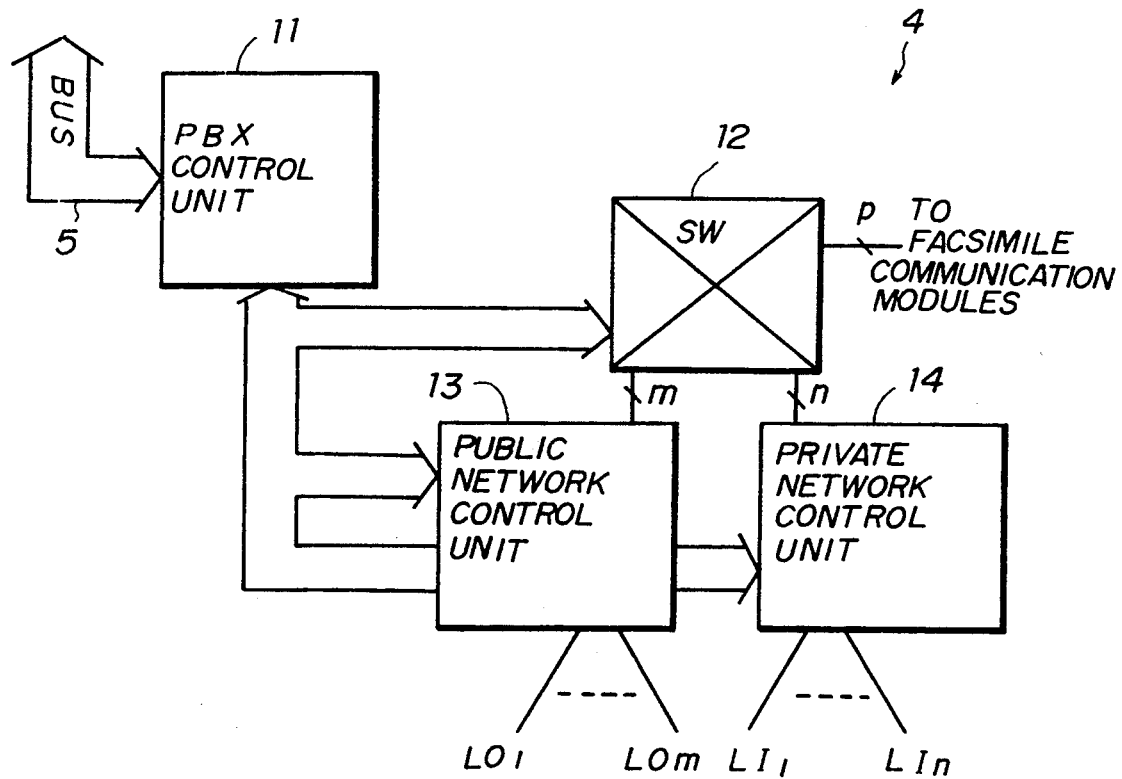
FIG. 2 is a block diagram illustrating an example of an exchange shown in FIG. 1.

Referring to FIG. 1, which is a block diagram illustrating a storage-and-forward apparatus for a facsimile according to the first embodiment of the present invention, the storage-and-forward apparatus 1 has a system controller 2, an image memory 3, a plurality of facsimile communication modules $FM_1$ through $FM_p$ and an exchange 4. The system controller 2, each of the facsimile communication modules $FM_1$ through $FM_p$ and the exchange 4 are connected by a bus 5 to each other.

The system controller 2 has a central processing unit (CPU), a read only memory (ROM), a random access memory (RAM) and so on. The ROM stores a basic program for this storage-and-forward apparatus 1, processing programs such as a program for changing process modes and so on. The system controller 2 controls various parts of the storage-and-forward apparatus 1 based on the program stored in the ROM and sequentially carries out various processes. The system controller 2 also carries out a process for changing the modes according to the present invention.

The image memory 3 comprises, for example, a storage device, which has large capacity, such as a hard disc unit or an optical disc unit. The image memory 3 stores image information which is received by the storage-and-forward apparatus 1.

A plurality of public lines $LO_1$ through $LO_m$ and a plurality of private lines $LI_1$ through $LI_n$ are connected to the exchange 4. The private lines $LI_1$ through $LI_n$ are located in-plant and facsimile machines $F_1$ trough $F_n$ are respectively connected to the private lines $LI_1$ through $LI_n$. The exchange 4 has a construction shown in FIG. 2. In FIG. 2, the exchange 4 has a PBX control unit 11, a switching unit 12, a public network control unit 13, a private network control unit 14 and so on. The system controller 2 transmits commands, responses and data to the PBX control unit and vice versa. On the basis of the commands from the system controller 2, the PBX control unit 11 controls various parts of the exchange 4 so as to sequentially carry out processes which should be carried out in the exchange 4. The PBX control unit 11 also has a timer function for measuring a waiting time which will be described later. The switching unit 12 connects lines to each other and disconnects the lines from each other. That is, the switching unit 12 carries out a connection and disconnection between each two of the private lines $LI_1$-$LI_n$, and between each private line and each public line. The switching unit 12 also carries out the connection and disconnection between each of the lines and each of facsimile communication modules $FM_1$-$FM_p$, respectively.

The public lines $LO_1$-$LO_m$ are connected to the public network control unit 13. The public network control unit 13 receives calls with respect to the public lines $LO_1$-$LO_m$ and carries out a call control such as a control for an on-hook and a control for an off-hook. The public network control unit 13 also detects a state where a communication terminal (facsimile) coupled to a public line is communicating with another communication terminal. The private lines $LI_1$-$LI_n$ are connected to the private network control unit 14. The private network control unit 14 transmits calls to the private lines $LI_1$-$LI_n$ and supplies direct currents (DC) to the private lines $LI_1$-$LI_n$. The private network control unit 14 also determines whether a selecting signal which identifies the communication terminal and is transmitted via each private line corresponds to a dialing pulse (DP) or a signal generated by pressing keys (PB) of a calling facsimile. Each of the facsimile communication modules $FM_1$-$FM_p$ has units which are used for a facsimile communication. These units of each facsimile module include a modem, a network controller, a code/decode unit and so on. Each facsimile communication module carries out the facsimile communication with the facsimile coupled to each private line, and also with the communication terminal coupled to each public line. That is, each facsimile communication module receives the image information which is transmitted by the facsimile coupled to either the private line or the public line, and each facsimile communication module supplies the image information to the facsimile coupled to either the private line or the public line. The communications between respective facsimile communication modules and the facsimiles are independently carried out.

The storage-and-forward apparatus 1 responds to requests from the communication terminals, such as the facsimiles, which are coupled to the public lines $LO_1$-$LO_m$ and the private lines $LI_1$-$LI_n$. For example, the storage-and-forward apparatus 1 carries out various communication services based on the direct transmission mode and the substitute receiving mode requested by the communication terminals.

A description will now be given of an operation of the storage-and-forward apparatus 1 described above with reference to FIG. 3.

Figure 3:
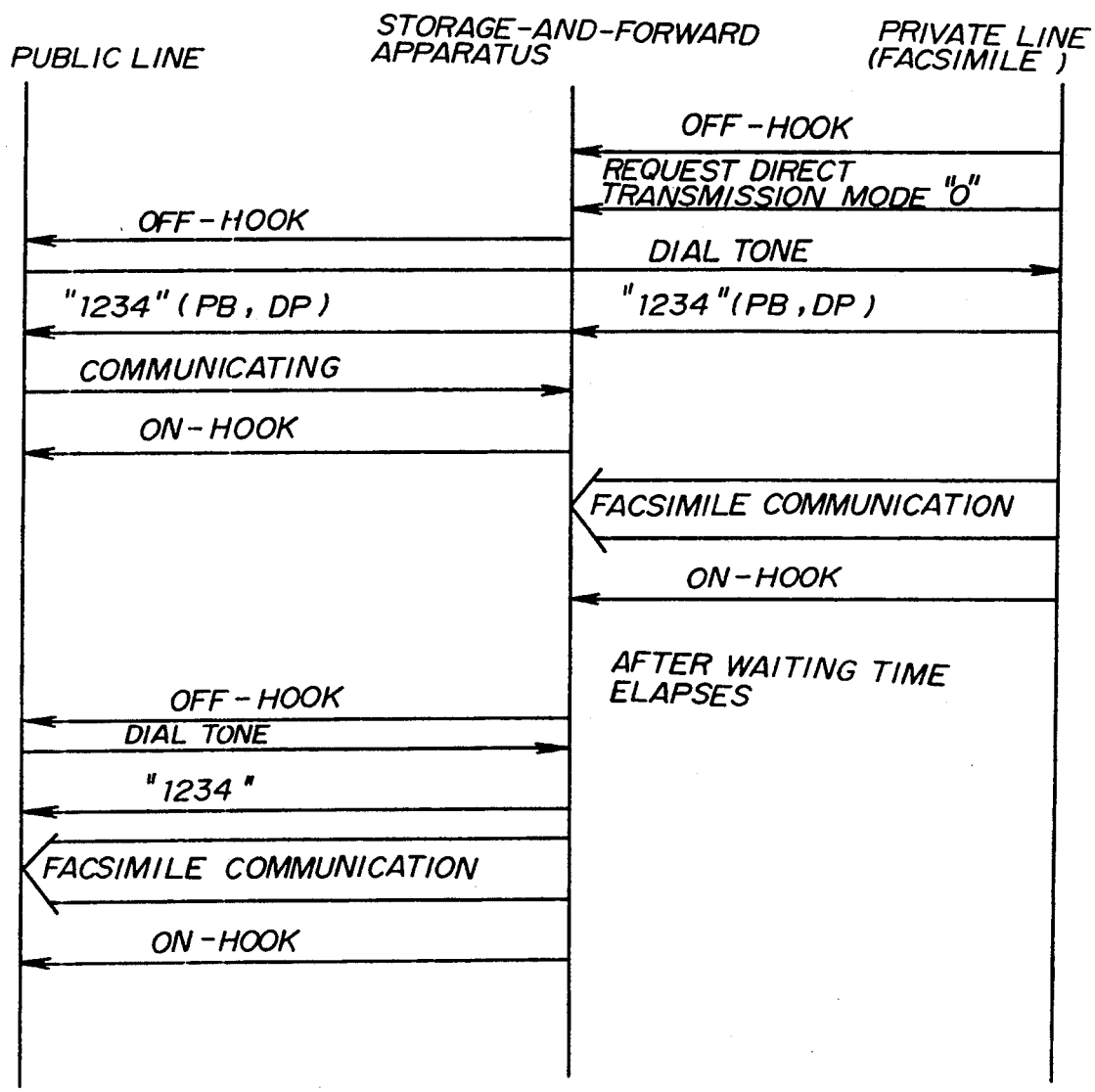
FIG. 3 is a sequential chart illustrating a procedure for changing communication modes.

Referring to FIG. 3, which shows a procedure for changing a communication mode from the direct transmission mode to the substitute receiving mode, when a calling facsimile coupled to a private line is off hooked and transmits a command for requesting the process in the direct transmission mode to the storage-and-forward apparatus 1, the storage-and-forward apparatus 1 connects the private line to a public line, to which a destination identified by the calling facsimile is coupled. For example, the command for requesting the process in the direct transmission mode is denoted by a code "0". Then, the storage-and-forward apparatus 1 makes the public line off hook. When a dial tone is returned via the public line and the private line to the calling facsimile, the calling facsimile outputs a selecting signal, which is either the dialing pulse (DP) or the signal generated by pressing keys of the calling facsimile (PB), to the private line. When this occurs, the storage-and-forward apparatus 1 stores the selecting signal in the RAM. The selecting signal corresponds to a phone number and is denoted by a code "1234". The selecting signal identifies the destination.

In a case where the selecting signal is supplied to the public line, when a call establishment is carried out with respect to the public line, the calling facsimile communicates the destination in the direct transmission mode. That is, the storage-and-forward apparatus directly relays the image information, which is transmitted from the calling facsimile via the private line, to the public line to which the destination is coupled.

On the other hand, when the destination which is coupled to the public line is communicating with another communication terminal, the public network control unit 13 detects the state where the destination is communicating with the another communication terminal. In this case, the storage-and-forward apparatus 1 immediately makes the public line to which the destination is coupled disconnect (on hook) and changes the communication mode from the direct transmission mode to the substitute receiving mode. That is, the private line coupled to the calling facsimile is connected to a facsimile communication module which is not used for another communication. Then the communication between the calling facsimile and the facsimile communication module is carried out, so that the storage-and-forward apparatus 1 carries out a communication process in the substitute receiving mode. In this case, the storage-and-forward apparatus 1 transmits a receiver terminal identification (RTI) message to the calling facsimile via the public line so as to inform the calling facsimile that the storage-and-forward apparatus 1 is carrying out the communication process in the substitute receiving mode instead of the direct transmission mode. In the communication process in the substitute receiving mode, the storage-and-forward apparatus 1 stores the image information transmitted from the calling facsimile in the image memory 3. When all the image data from the calling facsimile is stored in the image memory 3, the storage-and-forward apparatus 1 disconnects the private line which is coupled to the calling facsimile. Then the system controller 2 measures a time by use of the timer function thereof. When a predetermined waiting time elapses, the system controller 2 controls the exchange 4 so that the public line coupled to the destination is off hooked. When the dial tone from the destination is returned to the storage-and-forward apparatus 1, the storage-and-forward apparatus 1 calls the destination based on the selecting code "1234" stored in the memory. When the destination responds to the call from the storage-and-forward apparatus 1, the storage-and-forward apparatus 1 transmits the image information stored in the image memory 3 to the destination. When all the image information has been sent to the destination, the storage-and-forward apparatus 1 disconnects the public line which is coupled to the destination.

According to the first embodiment, in the case where the calling facsimile which is coupled to the private line requests the communication process in the direct transmission mode, when the destination is communicating with another communication terminal, the storage-and-forward apparatus 1 changes the communication mode from the direct transmission mode to the substitute receiving mode. Thus, the image information from the calling facsimile can be transmitted to the destination after the communication between the destination and the other communication terminal is finished. As a result, it is unnecessary for the user of the calling facsimile to again operate the calling facsimile to set either the direct transmission mode or the substitute receiving mode. In addition, the image information from the calling facsimile can be definitely transmitted to the destination.

Also, in the first embodiment described above, the storage-and-forward apparatus 1 informs the calling facsimile that the communication mode has been changed from the direct transmission mode to the substitute receiving mode. As a result, the user of the calling facsimile can recognize that the communication mode has been changed from the direct transmission mode to the substitute receiving mode. Therefore, it is possible to increase the reliability of the storage-and-forward apparatus 1.

A description will now be given of a second embodiment of the present invention with reference to FIGS. 4, 5 and 6.

Figure 4:
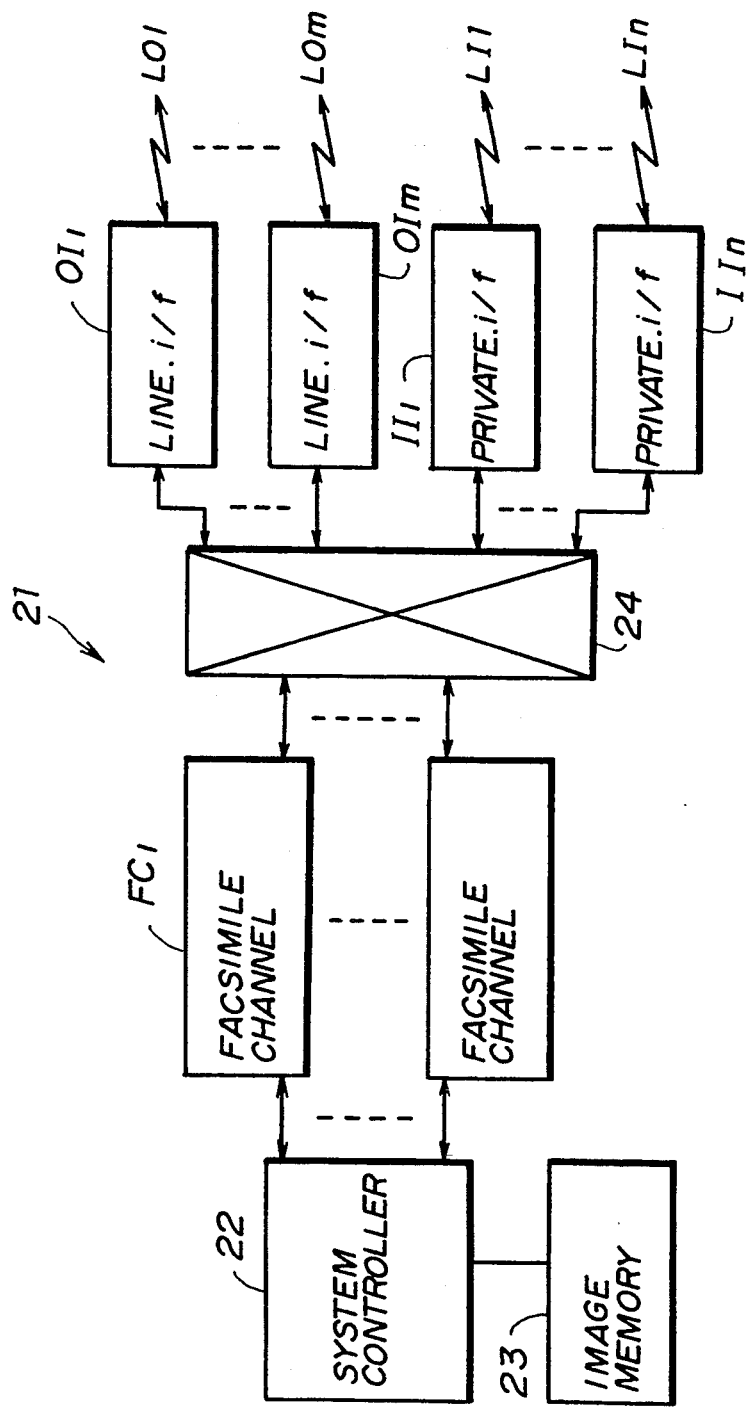
FIG. 4 is a block diagram illustrating a storage-and-forward apparatus according to a second embodiment of the present invention.
Figure 5:
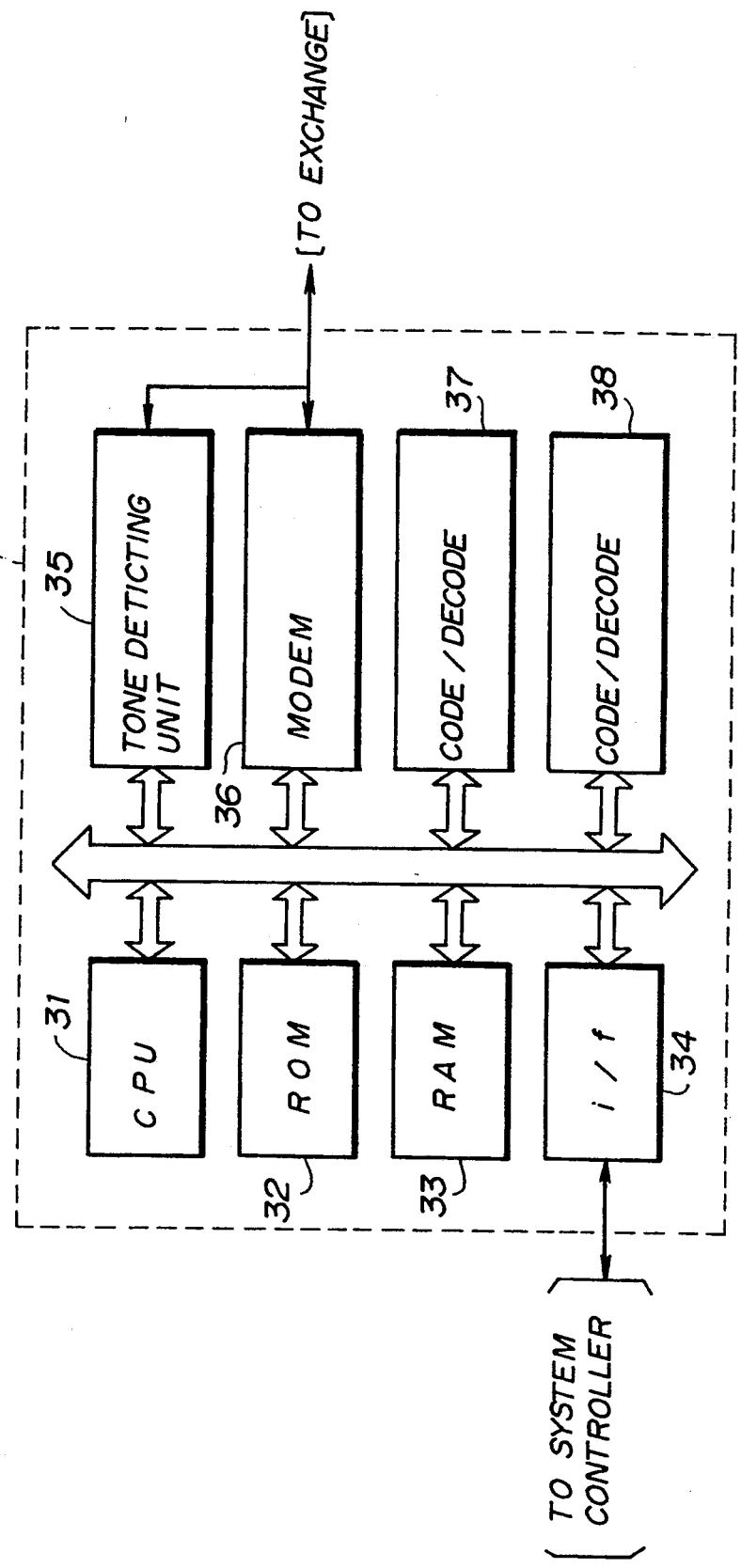
FIG. 5 is a block diagram illustrating an example of each of the facsimile channel units shown in FIG. 4.

Referring to FIG. 4, which is a block diagram illustrating a storage-and-forward apparatus according to the second embodiment of the present invention, the storage-and-forward apparatus 21 has a system controller 22, an image memory 23, a plurality of facsimile channel units $FC_1$ through $FC_n$, an exchange 24, a plurality of line interfaces $OI_1$ through $OI_m$ and private line interfaces $II_1$ through $II_n$. The public lines $LO_1$ through $LO_m$ are connected to the line interfaces $OI_1$ through $OI_m$, respectively. The private lines $LI_1$ through $LI_n$ are connected to the private line interfaces $II_1$ through $II_n$, respectively.

The system controller 22 has a central processing unit (CPU), a read only memory (ROM), a random access memory (RAM) and so on. A basic program for the storage-and-forward apparatus 21, a program for changing the communication mode, a program for setting an order of transmission of image information and so on are stored in the ROM. The system controller 21 controls various parts of the storage-and-forward apparatus 21 based on the programs stored in the ROM, so that processes in the storage-and-forward apparatus 21 are sequentially carried out, and a process for changing the communication mode and a process for setting the order of the transmission of the image information are also carried out.

The image memory 3 comprises a storage device, which has a large capacity, such as a hard disc unit and an optical disc unit.

The exchange 24 is connected to the public lines $LO_1$-$LO_m$ and the private lines $LI_1$-$LI_n$ via the line interfaces $OL_1$-$OI_m$ and the private line interfaces $II_1$-$II_n$. Each of the private lines $LI_1$-$LI_n$ is connected to a facsimile (not shown). The exchange 24 connects lines to each other and disconnects the lines from each other. That is, the exchange 24 carries out a connection and disconnection between each two of the private lines $LI_1$-$LI_n$, and between each private line and each public line. The exchange 24 also carries out a connection and disconnection between each of the lines and each of the facsimile channel units, respectively.

The line interfaces $OI_1$-$OI_m$ receive calls from the public lines $LO_1$-$LO_m$ and carry out call controls with respect to the public lines $OL_1$-$OL_m$. Each of the line interfaces $OI_1$-$OI_m$ also has a function for detecting whether or not the communication terminal coupled to each public line is communicating with another communication terminal. The private line interfaces $II_1$–$II_n$ output calls to the private lines $LI_1$–$LI_n$ and supplies a direct current (DC) to the private lines.

A plurality of facsimile channel units $FC_1$ through $FC_n$ are provided in the storage-and-forward apparatus 21. As shown in FIG. 5, each of the facsimile channels $FC_1$ through $FC_n$ has a CPU 31, a ROM 32, a RAM 33, an interface 34, a tone detecting unit 35, a modem 36 and code/decode units 37 and 38. A basic program of each of the facsimile channel units $FC_1$–$FC_n$ is stored in the ROM 32. The CPU 31 controls various parts of each of the facsimile channel units $FC_1$–$FC_n$ based on the programs stored in the ROM 32 so that processes in each facsimile channel unit are sequentially carried out. The RAM 33 stores various data used for a control in each facsimile channel unit. The interface 34 is connected to the system controller 22 shown in FIG. 4. The tone detecting unit 35 detects a tone signal which is transmitted from a destination. The modem 36 modulates a transmission signal and demodulates a receiving signal. Each of the code/decode units 37 and 38 codes the image information in accordance with a predetermined coding method so that a time for transmission of the image information decreases and the image information is effectively stored in the image memory 23. Each of the code/decode units 37 and 38 also decodes the image information which is coded.

A description will now be given of an operation of the storage-and-forward apparatus 21 with respect to FIG. 6.

FIG. 6 is a flow chart illustrating processes for changing a communication mode and for preferentially transmitting image information stored in the image memory 23.

Referring to FIG. 6, step S1 inputs a call from a calling facsimile coupled to a private line and an instruction of the direct transmission mode which is requested by the calling facsimile. Step S2 calls a destination and determines whether or not the destination has responded to the call from the storage-and-forward apparatus 21 and whether or not the destination is communicating with another communication terminal. When the result in step S2 is NO, step S3 connects the private line coupled to the calling facsimile to a public line coupled to the destination, and carries out a communication process in the direct transmission mode. That is, the storage-and-forward apparatus 21 directly relays image information which is transmitted from the calling facsimile via the private line to the public line to which the destination is coupled.

On the other hand, when the destination is communicating with another communication terminal, the result in step S2 is YES. In this case, step 4 immediately disconnects the public line coupled to the destination and changes the direct transmission mode to the substitute receiving mode so that the communication process is carried out in the substitute receiving mode. That is, the private line coupled to the calling facsimile is connected to a facsimile channel unit which is not used for the communication. The facsimile communication between the facsimile channel and the calling facsimile coupled to the private line is carried out in the substitute receiving mode. When this occurs, the storage-and-forward apparatus 1 may transmit the RTI message denoting that the process has been carried out in the substitute receiving mode instead of the direct transmission mode to the calling facsimile, in the same manner as that in the first embodiment described above. In the substitute receiving mode, the storage-and-forward apparatus 21 stores the image information from the calling facsimile coupled to the private line in the image memory 23. When all the image information is stored in the image memory 23, the storage-and-forward apparatus 21 disconnects the private line coupled to the calling facsimile. Then step S5 preferentially carries out a process for transmitting the image information which is stored in the image memory 23 in the substitute receiving mode instead of the direct transmission mode. That is, the system controller 22 sets a transmission order which is an order to transmit various image information stored in the image memory 23. The transmission order can be determined by various methods so that the image information which is stored in the image memory 23 in the substitute receiving mode instead of the direct transmission mode is preferentially transmitted to the destination. For example, the transmission order with respect to the image information which is stored in the image memory 23 in the substitute receiving mode instead of the direct transmission mode is determined so that it has priority over the other image information stored in the image memory 23. Various image information stored in the image memory 23 are transmitted to destinations in the transmission order determined above. In a case where the image information stored in the image memory 23 in the substitute receiving mode instead of the direct transmission mode is transmitted to the destination, system controller 22 controls the exchange 24 so that the public line coupled to the destination is off hooked. When a dial tone from the destination returns via the public line to the storage-and-forward apparatus 21, the storage-and-forward apparatus 21 calls the destination identified by the selecting code stored in the memory. When the destination responds to the call from the storage-and-forward apparatus 1, the storage-and-forward apparatus 1 transmits the image information stored in the image memory 23 to the destination. When all the image information stored in the image memory in the substitute receiving mode instead of the direct transmission mode is completely transmitted, in step 6, the public line coupled to the destination is on hooked. After that, step 7 calls the calling facsimile coupled to the private line and returns, to the calling facsimile, a message for indicating that the image information has been completely transmitted to the destination.

In the second embodiment described above, in the case where the calling facsimile requests the communication process in the direct transmission mode, when the destination coupled to the public line is communicating with another communication terminal, the communication mode is changed from the direct transmission mode to the substitute receiving mode. That is, the image information transmitted from the calling facsimile is stored in the image memory. Then the image information stored in the image memory in the substitute receiving mode instead of the direct transmission mode is preferentially transmitted to the destination. As a result, it is unnecessary for the user of the calling facsimile to again operate the calling facsimile to set either the direct transmission mode or the substitute receiving mode. In addition, in the case where the calling facsimile requests the direct transmission mode so as to rapidly transmit the image information, even if the destination is communicating to another communication terminal, it is possible to definitely and rapidly transmit the image information from the calling facsimile to the destination.

The present invention is not limited to the aforementioned embodiments, and variations and modifications may be made without departing from the scope of the claimed invention.

What is claimed is:

1. A storage-and-forward apparatus which accommodates a plurality of first lines and a plurality of second lines, each of the first lines being coupled to a communication terminal and each of the second lines being coupled to a communication terminal, said storage-and-forward apparatus comprising:

exchange means for carrying out a connection and a disconnection between each of the first lines and each of the second lines;

memory means for storing information transmitted via each of the first lines from said communication terminal;

first mode communication means, coupled to said exchange means, for directly relaying information transmitted via each of the first lines from said communication terminal to a destination coupled to a corresponding one of the second lines;

second mode communication means, coupled to said exchange means and said memory means, for storing the information via each of the first lines from said communication terminal in said memory means and for transmitting the information stored in said memory means to said destination via a corresponding one of the second lines; and mode changing means, coupled to said first and second mode communication means, for activating said second communication means in a case where the communication terminal transmits a command requesting a communication by said first mode communication means to said storage-and-forward apparatus when the destination is communicating with another communication terminal, said storage-and-forward apparatus further comprising means for, when said second mode communication means is activated by said mode changing means, informing the communication terminal, which has requested communication to be performed by said first mode communication means, of activation of the second mode communication means.

2. A storage-and-forward apparatus as claimed in claim 1, wherein said mode changing means comprises detecting means for detecting a state where the destination is communicating with said another communication terminal, and wherein said mode changing means activates said second mode communication means when said detecting means detects the state where the destination is communicating with said another communication terminal.

3. A storage-and-forward apparatus as claimed in claim 1, wherein said second mode communication means comprises storing control means for storing the information transmitted via each of the first lines from said communication terminal in said memory means, and transmission means for transmitting the information stored in said memory means to said destination via the corresponding one of the second lines.

4. A storage-and-forward apparatus as claimed in claim 3, wherein said transmission means comprises timer means for detecting a predetermined waiting time starting from a time when said memory means stores all information transmitted from said communication terminal, and wherein said transmission means transmits the information stored in said memory means to the destination when said timer means detects the predetermined waiting time.

5. A storage-and-forward apparatus as claimed in claim 1, wherein said first lines include private lines which are located in-plant.

6. A storage-and-forward apparatus as claimed in claim 1, wherein said second lines include public lines.

7. A storage-and-forward apparatus as claimed in claim 1, wherein the communication terminals coupled to the first lines and second lines include facsimiles.

8. A storage-and-forward apparatus as claimed in claim 7, wherein said second mode communication means stores image information transmitted via each of the first lines from said communication terminal in said memory means.

9. A storage-and-forward apparatus which accommodates a plurality of first lines and a plurality of second lines, each of the first lines being coupled to a communication terminal and each of the second lines being coupled to a communication terminal, said storage-and-forward apparatus comprising:

exchange means for carrying out a connection and a disconnection between each of the first lines and each of the second lines;

memory means for storing information transmitted via each of the first lines from said communication terminal;

first mode communication means, coupled to said exchange means, for directly relaying information transmitted via each of the first lines from said communication terminal to a destination coupled to a corresponding one of the second lines;

second mode communication means, coupled to said exchange means and said memory means, for storing the information via each of the first lines from said communication terminal in said memory means and for transmitting the information stored in said memory means to said destination via a corresponding one of the second lines; and mode changing means, coupled to said first and second mode communication means, for activating said second communication means in a case where the communication terminal transmits a command requesting a communication by said first mode communication means to said storage-and-forward apparatus when the destination is communicating with another communication terminal, wherein said second mode communication means further comprises order setting means for setting a transmission order which is an order to transmit the information stored in said memory means so that the information which is stored in said memory means when said mode changing means activates said second mode communication means has priority over other information stored in said memory means, and wherein said second mode communication means transmits information to the destination due to the transmission order set by said order setting means.

* * * * *